United States Patent [11] 3,599,739

| [72] | Inventor | Frank S. Hyer |
| | | Duxbury, Mass. |
| [21] | Appl. No. | 35,113 |
| [22] | Filed | May 6, 1970 |
| [45] | Patented | Aug. 17, 1971 |
| [73] | Assignee | Cutler-Hammer, Inc. |
| | | Milwaukee, Wis. |

[54] OVERLOAD PROTECTION FOR STRAIN GAUGE LOAD CELLS USED IN WEIGH SCALE LOAD MEASUREMENT
5 Claims, 5 Drawing Figs.

[52] U.S. Cl. ..................................................... 177/211
[51] Int. Cl. ..................................................... G01g 3/14
[50] Field of Search ........................................... 177/153, 164, 187, 210—211

[56] References Cited
UNITED STATES PATENTS

| 745,684 | 12/1903 | Stimpson | 177/187 |
| 1,142,165 | 6/1915 | Hapgood | 177/187 |
| 1,646,151 | 10/1927 | Kennedy | 177/187 |
| 1,654,648 | 1/1928 | Hem | 177/187 |
| 3,120,754 | 2/1964 | Lebow | 177/211 X |
| 3,502,164 | 3/1970 | Akuta et al. | 177/164 |

Primary Examiner—Richard B. Wilkinson
Assistant Examiner—George H. Miller, Jr.
Attorney—Hugh R. Rather ABSTRACT: An overload protective arrangement for strain gauge type load cells used in weigh scale force measurement. Calibrated springs are interposed in the tension coupling between the load cell and the weigh scale load resolving lever to provide an inextensible link in the coupling until the designed load limit of the scale is reached and as a progressively extensible link when the scale load limit is exceeded. Another embodiment uses a piston moving in a fluid pressure cylinder as part of such coupling in place of springs.

PATENTED AUG 17 1971

Inventor
Frank S. Hyer
By H R Rather
Attorney

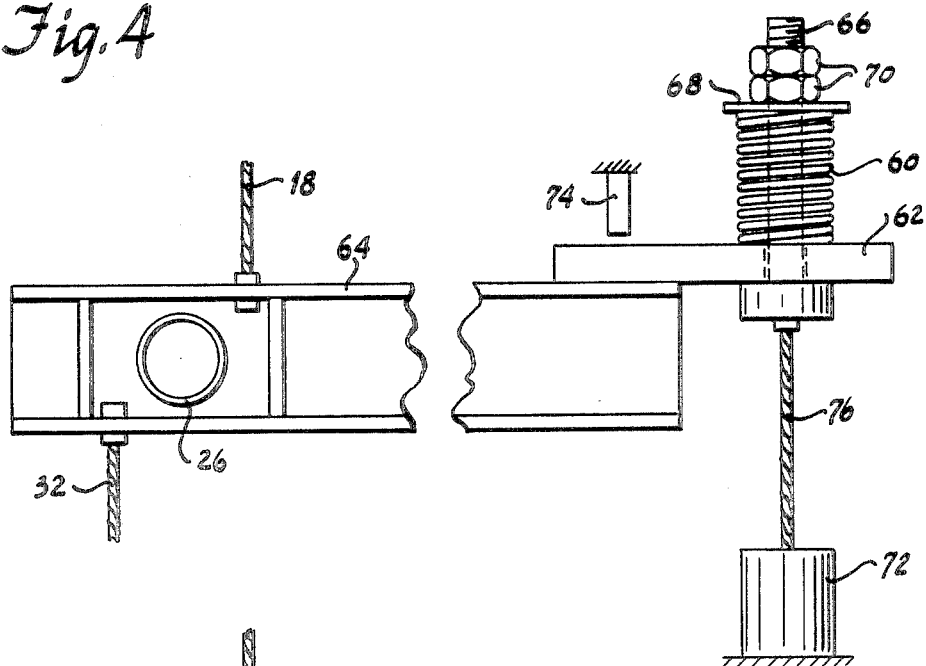
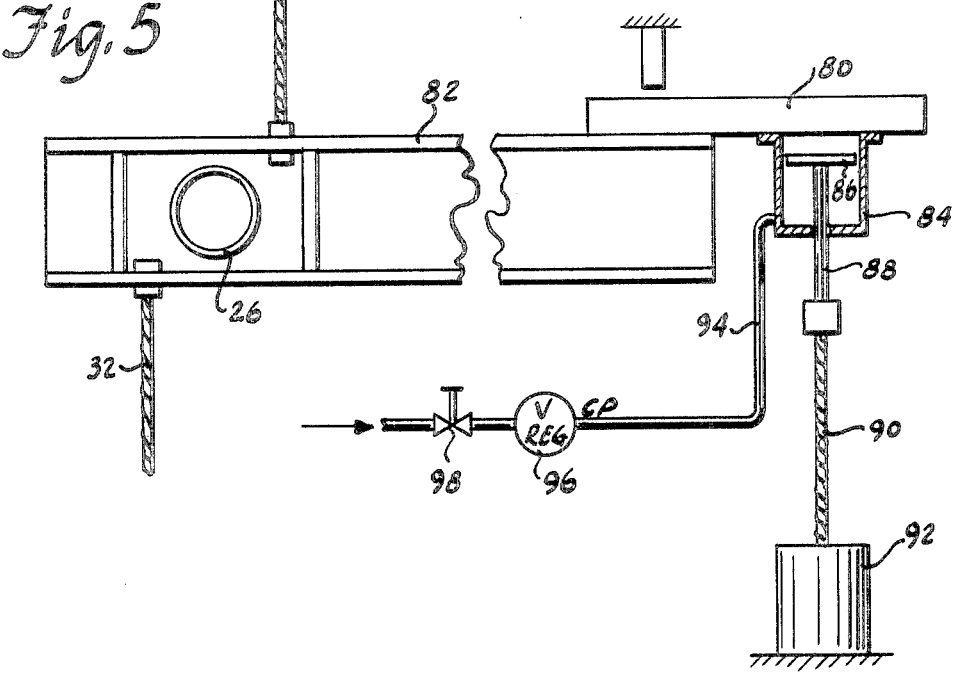

OVERLOAD PROTECTION FOR STRAIN GAUGE LOAD CELLS USED IN WEIGH SCALE LOAD MEASUREMENT

BACKGROUND OF THE INVENTION

In weighing scale systems employing electrical indication of weight measurement, linear variable differential-transformer (LVDT)-type weigh scale force responsive transducers or load cells are commonly employed. Typically, the movable element of such transducers move 0.1 inch over the range of weigh scale force developed. As weight scales go above 5,000 pounds capacity, the accuracy of such load cells goes down percentagewise as a function of maximum scale capacity. While resistance type strain gauge load cells have heretofore been used, their application has involved certain complications.

Movement or deflection of strain gauge load cells typically is one-twentieth of that of LVDT load cells or 0.005 inches for full load scale range compared with 0.1 inch of the latter load cell. Such load cells are essentially inelastic and the problem of providing built-in overload limit stops is difficult since a deflection of 0.001 inch beyond the full range of 0.005 inch would represent a 20 percent overload.

It is a primary object of the present invention to provide an improved weighing scale system employing an improved strain guage force measuring arrangement.

A more particular object is to provide a novel and simpler overload compensating arrangement for strain gauge load cells subjected to tension force by a weigh scale lever system.

Other objects and advantages of the invention will hereinafter appear.

SUMMARY OF THE INVENTION

On one preferred embodiment, the invention is applied to a weighing scale mechanism of the type described in the Hyer et al. U.S. Pat. No. 3,477,533. In that scale system, the movement of any of the final load resolving lever arm is limited to approximately 0.1 inch over the range of weight to be handled. A strain guage load cell is used in place of the LVDT load cell, and is connected by a cable or rod to a calibrated spring carried on the lever arm. The spring is calibrated so that it has zero deflection up to the point of the designed maximum weight force, and then progressively deflects until the lever arm engages a fixed stop. Thus, the load cell will not be subjected to any greater overload than is required to move the lever arm a readily calibrated distance, say 0.1 inch, into the stop. Up to the point of spring deflection, it acts as an unextensible connection or link between the strain gauge load cell, and then acts as a progressively extending link after the overload force value is reached. Thus, a selected strain gauge load cell need not have excessive overload capacity for a given designed weigh scale range to successfully cope with overload conditions.

A disclosed variation of the invention uses a piston in a fluid or hydraulic cylinder under a predetermined pressure to provide action similar to that of the springs heretofore described when the designed upper weigh force is exceeded.

BRIEF DESCRIPTION OF THE DRAWINGS

FIG. 4 is a view similar to FIG. 2 of a modified form of the invention; and

FIG. 5 is a view similar to FIG. 4 showing still another modified form of the invention.

DESCRIPTION OF THE PREFERRED EMBODIMENT

Figure 1:
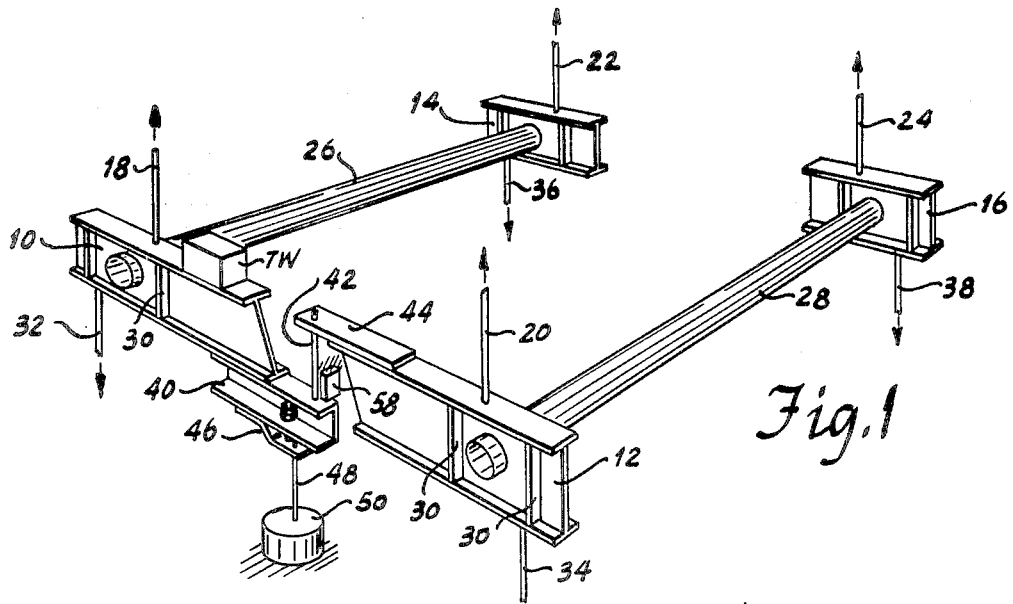
FIG. 1 is a schematic view in perspective of a weigh lever system together with load cell force measuring arrangement that incorporates the invention.

As shown in FIG. 1, weigh lever arms 10, 12, 14 and 16 are individually suspended on cables 18, 20, 22 and 24, which may be assumed to be attached at their upper ends to portions of a stationary support frame not shown similarly to that shown in the Hyer et al. U.S. Pat. No. 3,477,633. The arms 10 and 14 are nonrotatably mounted on and interconnected by the cylindrical torque member 26, and arms 12 and 16 are correspondingly mounted on and interconnected on a like torque member 28. Arms 10, 12, 14 and 16 are preferably formed of "I" cross section beams and have strengthening gusset plates 30 welded thereto adjacent the points where the torque members 26 and 28 extend therethrough.

Cables 32, 34, 36 and 38 extend downwardly from the arms 10, 12, 14 and 16 respectively on sides opposite of the torque members 26 and 28 from that to which the cables 18, 20 22 and 24 are attached. As will be understood, a weigh platform or hopper, not shown, would be suspended from the lower ends of cables 32, 34, 36 and 38. The platform or hopper depending upon its weight and that of material or articles therein will tend to rotate arms 10 and 14 counterclockwise and arms 12 and 16 clockwise as viewed in FIGS. 1 and 2.

A channel-shaped member 40 is secured to the bottom flange of arm 10 as be welding. A cable 42 is secured at its lower end to the upper flange of arm 10 and is secured at its upper end to a bracket 44 which extends from and is secured to the upper surface of arm 12. The upward or clockwise force exerted by the weigh load on arm 12 is thus added by cable 42 to that on arm 10 and the latter is thus the final load-resolving arm.

Figure 2:
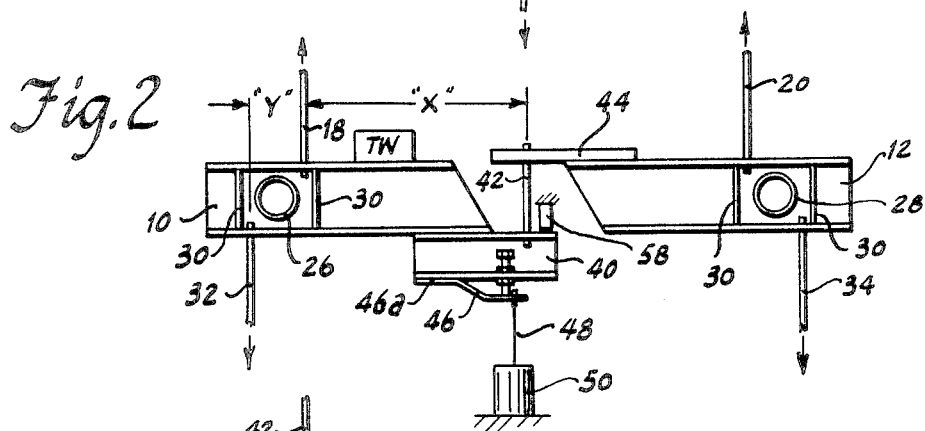
FIG. 2 is a view inside elevation of the lever system and load cell arrangement of FIG. 1.
Figure 3:
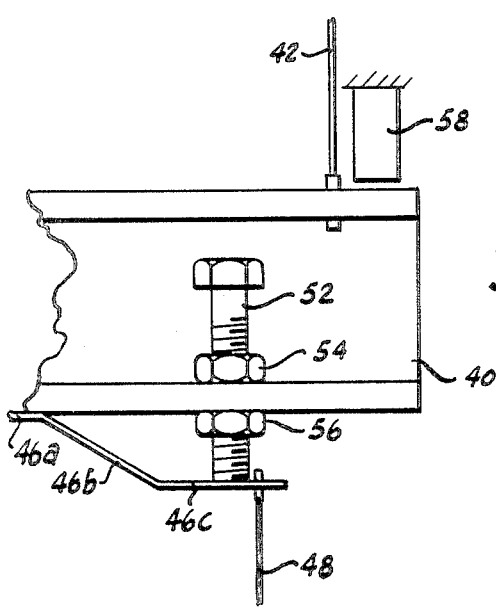
FIG. 3 is a fragmentary view to enlarged scale of a portion of the apparatus shown in FIG. 2.

A flat spring member 46 which is preferably bent or shaped in profile as depicted in FIGS. 2 and 3 is secured at its portion 46a to the outer surface of the lower flange of member 40. A portion 46b extending downwardly and to the right integrally interconnects portion 26a with a portion 46c which extends generally parallel with the lower flange of member 40. A cable 48 secured to portion 46c at its upper end connects with a strain gauge type load cell 50 which has a stationary mounting.

A machine bolt 52 is threaded in and extends through the lower flange of member 40. Bolt 52 at its lower end bears against the portion 46c of member, and according to its adjustment determines the amount of force required to flex member 46. nuts 54 and 56 threaded on bolt 50 above and below the lower flange of member 40 when tightened serve to secure bolt 50 in adjusted position. A fixed limit stop 58 is interposed above the upper flange of member 40 serves to limit the upward movement of the latter and the arms 10 and 12 when the maximum load limit of the weigh scale mechanism is reached.

It will be seen from the foregoing that except for the member 46, the bolt adjusting member 46, and strain gauge load cell 50, the aforedescribed weigh scale lever system is essentially that described in the Hyer et al. U.S. Pat. No. 3,477,533. As explained in that patent, the tension exerted on cable 48 will be directly proportional to the downward force exerted by the weigh platform or hopper on the cables 32, 34, 36 and 38.

A weight TW is affixed to the upper surface of arm 10 to provide tare weight balancing of the empty weight of the weigh platform or hopper that is suspended from the cable 32, 34, 36 and 38. With weight Tw suitably selected and positioned on arm 10, zero force will be exerted upwardly on cable 48 when the scale platform or hopper is empty.

The mechanical advantage provided by the lever system is numerically equal to the horizontal distance "X" between the cables 18 and 42 divided by the horizontal distance "Y" between cables 18 and 32. Typically in a scale capable of handling 5 ton loads, such mechanical advantage would have a value of 10. Under full load, the upward displacement of the adjacent ends or arms 10 and 12 if they were free to move would be about 0.005 inches/deflection for strain gauge cell while the downward displacement of the suspended weigh frame or hopper would be 0.0005 inch. However, since the bending force required to bend portion 46c downwardly is adjusted to an amount equal to the load cell tension at full load, no appreciably upward movement of arms 10 and 12 will occur other than the normal 0.005 inch. When such upward force on arms 10 and 12 exceeds such adjusted amount, member 46 will bend downwardly to permit arm 10 and member 40 to move upwardly. If the load is increased, member 40 will eventually engage stop 58 and no further upward movement of arms 10 and 12 will occur.

In the proper use of the present invention, it is contemplated that spring member 46, as to bending force required and its adjustment by bolt 52, must be selected in accordance with the maximum load to normally be handled. Thus, if such maximum load to be weighed is 5,000 pounds, no bending of spring member 46 should occur until such load on the weigh platform is exceeded. Any weight in excess of the normal 5,000 maximum will cause a proportionate bending of member 46 up to the point at which member 40 engages the lower end of stop 58. Thus with the use of the overload calibration spring member 46, the sizing of a strain gauge load cell can be brought closer into line with the maximum load to be handled. Thus selecting a strain gauge load cell having not more than 25 percent greater capacity than the upper level of the load to be measured is practically feasible. This makes for greater accuracy in the scale measurement indication.

FIG. 4 shows the use of a coil spring 60 and attendant assembly in place of the flat spring member 46. In this modified version, a member 62 is secured to and projects beyond the end of lever arm 64. An elongated member 66 extends through a clearance opening in member 62, and through the coils of spring 60 and a washer 68. Member 66 is threaded adjacent its upper end and double nuts 70 take down thereon to draw washer 68 down in adjusted position against the upper end of spring 60. At its lower end member 66 is enlarged, and the upper end of a cable 76 is attached thereto. The lower end of cable 76 is attached to a strain gauge load cell 72 like load cell 50 of the embodiment of FIGS. 1 to 3.

As will be understood, spring 60 is selected and so adjusted between washer 68 and the upper surface of member 66 that no upward movement of arm 64 will occur until the designed upper load limit of the scale is reached. Any excess load will, of course, cause compression of spring 60 and permit upward movement of arm 64 until it engages the limit stop 74.

FIG. 5 depicts still another modified version wherein a piston in an air cylinder under pressure affords comparable overload protection for a strain gauge load cell. As depicted a member 80 is secured to the upper surface of a scale lever arm 82 and exceeds therebeyond. An air cylinder 84 is secured to the lower surface of the portion of member 80 extending beyond arm 82. A piston 86 is adapted to move within cylinder 84 and has a rod 88 connected thereto which exerts outwardly and beyond the lower end of cylinder 84. Rod 88 at its outward end is connected to the upper end of a cable 90 which is connected at its lower end to strain gauge 92.

Adjacent its lower end cylinder 84 is interiorally connected by an air conduit or pipe 94 which has interposed therein a pressure regulator 96, and an air shutoff valve 98. By proper sizing of the working area of piston 86 and setting of air pressure to be maintained by regulator 96, upward movement of arm 82 can be prevented until the normal designed load limit of the scale is reached. When such load is exceeded, arm 82 will immediately move upwardly.

It will be apparent that the use of the strain gauge load protection schemes hereinbefore described are not limited to use with the particular weigh scale lever system depicted. Of course, it may be used with any weigh scale lever system wherein the final load resolving lever exerts a tension force on the load cell. Depending upon the design and spacing of the load resolving lever from the load cell, it is apparent that numerous variations of the described arrangement can be made.

I claim:

1. The combination with a weigh scale having a weight responsive lever system with a load resolving lever which develops a force proportional to the total load being measured, of a strain-gauge-type load-measuring cell, and means interconnecting said load-resolving lever and said load cell and providing a tension coupling therebetween, said means including means acting as an inextensible link in the coupling until the force developed by said lever reaches a predetermined value and thereafter acting as an extensible link in accordance with the increase in force developed by said load-resolving lever.

2. The combination according to claim 1 wherein said included means comprises a piston movable in a fluid cylinder and means for developing a fluid pressure interiorly of said cylinder to hold said piston unmovable until the load applied on said lever exceeds said predetermined value.

3. The combination according to claim 1 wherein said included means comprises a spring calibrated to be unyieldable until the force applied on said coupling reaches said predetermined value, and thereafter extending proportionately to the increase in such force imposed on the coupling by said lever above said predetermined value.

4. The combination according to claim 3 wherein said spring is a flat member secured to said lever and said coupling and lying in a plane normal to said coupling for load values below said predetermined values and bending toward said load cell when said load value is exceeded.

5. The combination according to claim 3 wherein said spring is a coiled compression spring and the coupling includes a rigid member extending through said lever and said spring, and further includes means tending to compress spring on said lever on a side of the latter opposite to that on which said load cell lies.

PO-1050
(5/69)

UNITED STATES PATENT OFFICE
CERTIFICATE OF CORRECTION

Patent No. 3,599,739               Dated August 17, 1971

Inventor(s)  Frank S. Hyer

It is certified that error appears in the above-identified patent and that said Letters Patent are hereby corrected as shown below:

Column 2, line 7, "Patent No. 3,477,633" should be
    --Patent No. 3,477,533--.

line 25, "be" should be --by--;

line 45, "nuts" should be --Nuts--;

line 62, "Tw" should be --TW--

Signed and sealed this 18th day of April 1972.

(SEAL)
Attest:

EDWARD M. FLETCHER, JR.                ROBERT GOTTSCHALK
Attesting Officer                      Commissioner of Patents